United States Patent [19]

Daiku

[11] 4,376,829
[45] Mar. 15, 1983

[54] GLASS FOR USE IN MONOCHROMATIC COLORED LIGHT EMITTING CATHODE RAY TUBES

[75] Inventor: Nobutaka Daiku, Otsu, Japan

[73] Assignee: Nippon Electric Glass Company, Limited, Otsu, Japan

[21] Appl. No.: 272,038

[22] Filed: Jun. 9, 1981

[30] Foreign Application Priority Data

Jun. 12, 1980 [JP] Japan ................................. 55-79916

[51] Int. Cl.$^3$ .......................... C03C 3/04; C03C 3/30; C03C 3/10; C04B 35/68
[52] U.S. Cl. ........................................ 501/64; 501/60; 501/62; 252/478; 313/480
[58] Field of Search ........................... 501/60, 62, 64; 252/478; 313/480

[56] References Cited

U.S. PATENT DOCUMENTS

| | | | |
|---|---|---|---|
| 3,143,683 | 8/1964 | Duncan et al. | 313/480 |
| 3,373,302 | 3/1968 | Barber | 501/64 |
| 4,179,638 | 12/1979 | Boyd | 501/64 |
| 4,331,770 | 5/1982 | Thompson | 501/64 |
| 4,337,410 | 6/1982 | Van der Geer et al. | 501/64 |

FOREIGN PATENT DOCUMENTS

| | | | |
|---|---|---|---|
| 42-26307 | 12/1967 | Japan | 501/64 |
| 55-113644 | 9/1980 | Japan | 313/480 |

*Primary Examiner*—Mark Bell
*Attorney, Agent, or Firm*—Kurt Kelman

[57] ABSTRACT

In a plurality of monochromatic colored light emitted cathode ray tubes arranged in a surface to form a huge screen for displaying a colored picture, glass for use in light-source cathode ray tubes for emitting the red or the blue light has the optical characteristics that it can well pass the light in the wavelength range of the remaining blue and yellow portions of the spectrum to thereby improve contrast of the monochromatic colored red or green light source cathode ray tube. The glass essentially consists, by weight, of 50–75% $SiO_2$, 0–5% $Al_2O_3$, 0–4% CaO, 0–2% MgO, 0–12% SrO, 0–16% BaO, 0–3% PbO, 0–3% ZnO, 0–3% $ZrO_2$, the sum of $SrO+BaO+PbO+ZnO+ZrO_2$ being 1.5–25%, 0–4% $Li_2O$, 3–15% $Na_2O$, 1–10% $K_2O$, the sum of $Li_2O+Na_2O+K_2O$ being 5–24%, 0–2% $TiO_2$, 0.1–3% $CeO_2$, 1–10% $Nd_2O_3$, 0.5–5% $Pr_2O_3$, and 0.1–4% $Fe_2O_3$. According to the glass, the red light emitting cathode ray tube and the green light emitting cathode ray tube are produced only by a simple kind of glass without sacrificing contrast characteristic of the light-source cathode ray tubes emitting red light and green light, respectively. Thus, the red light emitting and the green light emitting cathode ray tubes using the glass are used together with the blue light emitting cathode ray tube to form a huge screen with a reduced cost and without pollution.

3 Claims, 2 Drawing Figures

GLASS FOR USE IN MONOCHROMATIC COLORED LIGHT EMITTING CATHODE RAY TUBES

BACKGROUND OF THE INVENTION

The present invention relates to glass for use in cathode ray tubes, and more particularly to glass for use in monochromatic colored light emitting, or light-source, cathode ray tubes for using to display a colored picture image on a huge screen installed in a score board of a stadium or in an outdoor ad pillar, which has been developed recently.

In the huge screen color imaging system, a set of three light-source cathode ray tubes form one picture element, on the inner surfaces of the respective glass bulbs of which are deposited red-, green- and blue-phosphor materials, respectively, to form cathode ray tubes for monochromatically emitting red, green and blue lights, respectively, as excited by electron beams from electron guns mounted within the respective glass tubes. A plurality of sets of three light-source cathode ray tubes are arranged in a matrix form to form the huge screen.

Such color imaging systems are necessitated to be of all-weather type and capable of displaying a clear picture image even in broad daylight. Accordingly, a light-source cathode ray tube is desired to have a high brightness and a good contrast while suppressing reflection of an external light. To that end, it is desired that a glass bulb of a light-source cathode ray tube should be highly transparent for the light emitted from the phosphor material and having the wavelength of the red, green or blue color, but should fully absorb the color light of the other wavelengths, for example, the yellow light such as the sun light at dusk, to which the human eyes are most sensitive as accompanied by dazzling, to clearly reproduce the respective red, green and blue colors.

In conventional color television tubes, it is known as disclosed in British Pat. No. 1,154,500 to apply an optical filter glass to a face plate, or a safety glass, of the color television tube, which has selective absorption and transmittance properties so that the transmission of light in the red, the green and the blue portions of the spectrum is permitted at a high rate but the transmission of the yellow portion is reduced, in order to provide improved color, contrast, and viewing characteristics.

Since the conventional color television tube displays a colored picture on its screen, such selective absorption and transmittance properties permitting sufficient transmission of the red, the green and the blue portion of the spectrum is important. But the glass is not useful for the light-source cathode ray tube, because the one colored light, or the red light emitted from the phosphor of a cathode ray tube is disturbed from the other portions of the spectrum, or the green and the blue portion of the external light reflection, so that the contrast is degraded.

Accordingly, in order to improve contrast of light-source cathode ray tubes, it will be first conceived to use respective glass bulbs individually colored red, green and blue, and it will be thought of that cadmium-selenium colored glass is used as the red glass, chromium colored glass is used as the green glass and cobalt colored glass is used as the blue glass. However, among these kinds of colored glass, while the manufacture of the cobalt colored blue glass and the chromium colored green glass is relatively easy, with regard to the cadmium-selenium colored red glass, especially the cadmium content comes into problem in view of a pollution and hence its manufacture is difficult. In addition, it is not economical to respectively manufacture such three kinds of colored glass.

In addition, in a cathode ray tube, since a high operating voltage is applied and thereby X-rays and electron-rays are generated, it is necessary that its glass bulb should have the capability of absorbing X-rays and should not be subjected to browning and discoloration which results in lowering of a transmittance coefficient due to X-ray and electron irradiation over a long period, but this filter glass does not have such characteristics.

SUMMARY OF THE INVENTION

It is an object of this invention to provide glass for use in a light-source cathode ray tube emitting the red light, or the green light.

It is another object of this invention to provide such a glass which has the optical characteristics that it can well pass the light in the wavelength range of the red and the green portions of the spectrum but absorbs the remaining blue and yellow portions of the spectrum to thereby improve contrast of the monochromatic colored, red or green, light source cathode ray tube.

It is still another object of this invention to provide such a glass which suffers from problems in view of a public hazard and is easy in production.

It is yet another object of this invention to provide such a glass which has a high X-ray absorption capability and the nature of being hardly subjected to discoloration due to X-ray and electron irradiation.

It is another object of this invention to provide such a glass which has an appropriate viscosity-temperature relation and a desired coefficient of thermal expansion in view of manufacture and working of the glass.

A glass for use in a cathode ray tube according to this invention has the composition essentially consisting, in weight %, of 50–75% $SiO_2$, 0–5% $Al_2O_3$, 0–4% CaO, 0–2% MgO, 0–12% SrO, 0–16% BaO, 0–3% PbO, 0–3% ZnO, 0–3% $ZrO_2$, the sum of $SrO+BaO+PbO+ZnO+ZrO_2$ being 1.5–25%, 0–4% $Li_2O$, 3–15% $Na_2O$, 1–10% $K_2O$, the sum of $Li_2O+Na_2O+K_2O$ being 5–24%, 0–2% $TiO_2$, 0.1–3% $CeO_2$, 1–10% $Nd_2O_3$, 0.5–5% $Pr_2O_3$ and 0.1–4% $Fe_2O_3$.

A preferable composition essentially consists, in weight %, of 55–70% $SiO_2$, 1–4% $Al_2O_3$, 0–4% CaO, 0–2% MgO, 0–12% SrO, 0–16% BaO, 0–3% PbO, 0–3% ZnO, 0–3% $ZrO_2$, the sum of $SrO+BaO+PbO+ZnO+ZrO_2$ being 2–15%, 0–4% $Li_2O$, 3–15% $Na_2O$, 1–10% $K_2O$, the sum of $Li_2O+Na_2O+K_2O$ being 10–20%, 0–2% $TiO_2$, 0.5–2.5% $CeO_2$, 4–8.5% $Nd_2O_3$, 1.5–3.5% $Pr_2O_3$ and 0.5–2.5% $Fe_2O_3$.

The sum of $SrO+BaO+PbO+ZnO+ZrO_2+CeO_2+Nd_2O_3+Pr_2O_3$ may be advantageously 6–29% by weight.

Further objects, features and aspects of this invention will be understood from the following detailed description of preferred embodiments of this invention referring to the accompanying drawings.

DETAILED DESCRIPTION OF PREFERRED EMBODIMENTS

This invention attempts to provide glass for use in a light-source cathode ray tube, which does not contain any harmful content as coming into problem in view of a public hazard, and which has the optical characteristics of passing the light in the wavelength range of red and green but absorbing the remaining blue and yellow colored light, so that only one kind of glass can be commonly used both for red light emitting cathode ray tube and for the green light emitting cathode ray tube, which is economical without sacrificing contrast characteristic of the light-source cathode ray tubes. The red light emitting cathode ray tube and the green light emitting cathode ray tube both using the glass according to this invention are used together with the blue light emitting cathode ray tube using a glass bulb colored blue as described above, to form the huge screen. Thus, the huge screen having excellent contrast can be obtained with a reduced cost.

Examples of compositions of the glass according to the present invention are shown in the following table. In addition, in the lower rows of the table are respectively indicated coefficients of thermal expansion at 30°–380° C., strain points, softening points and coefficients of X-ray absorption at the wavelength of 0.6 Å of the respective kinds of glass:

TABLE

| | Preferred Embodiments (weight %) | | | | | | | | |
|---|---|---|---|---|---|---|---|---|---|
| | No. 1 | No. 2 | No. 3 | No. 4 | No. 5 | No. 6 | No. 7 | No. 8 | No. 9 |
| $SiO_2$ | 61.6 | 61.9 | 60.1 | 64.6 | 62.8 | 65.8 | 63.5 | 63.2 | 61.5 |
| $Al_2O_3$ | 2.0 | 1.5 | 3.0 | 2.5 | 1.2 | 2.0 | 3.5 | 1.2 | 2.0 |
| CaO | — | 0.3 | 1.0 | — | — | — | 0.5 | 2.4 | — |
| MgO | — | 0.2 | 0.5 | — | — | — | 0.3 | 1.6 | — |
| SrO | — | — | 2.0 | 3.0 | 1.0 | 3.1 | 4.5 | — | 8.0 |
| BaO | 7.2 | 6.2 | 4.2 | 3.2 | 5.0 | — | — | — | — |
| PbO | — | 1.5 | — | 0.5 | — | — | 1.0 | — | 1.2 |
| ZnO | — | 1.5 | — | 0.5 | — | — | 1.0 | 2.0 | — |
| $ZrO_2$ | — | 0.5 | 1.0 | — | 2.0 | — | 0.5 | 2.5 | — |
| $Li_2O$ | 2.2 | 1.8 | 2.5 | 2.0 | 1.5 | 2.5 | 1.5 | 1.9 | 2.0 |
| $Na_2O$ | 8.4 | 8.1 | 9.5 | 7.5 | 5.0 | 9.5 | 11.0 | 10.0 | 8.0 |
| $K_2O$ | 3.3 | 3.7 | 4.0 | 5.0 | 8.0 | 3.8 | 2.9 | 3.0 | 4.0 |
| $TiO_2$ | 0.5 | 0.5 | 1.5 | 1.0 | 1.5 | 0.5 | — | — | 0.3 |
| $CeO_2$ | 2.0 | 2.0 | 1.0 | 1.5 | 0.8 | 2.0 | 0.6 | 2.2 | 1.5 |
| $Nd_2O_3$ | 8.0 | 6.5 | 5.5 | 4.5 | 7.0 | 6.5 | 5.0 | 6.0 | 7.5 |
| $Pr_2O_3$ | 2.8 | 2.3 | 2.0 | 1.8 | 3.2 | 2.4 | 1.9 | 2.2 | 3.0 |
| $Fe_2O_3$ | 2.0 | 1.5 | 2.2 | 2.4 | 1.0 | 1.9 | 2.3 | 1.8 | 1.0 |
| Coefficient of Thermal Expansion ($10^{-7}$/°C.) | 98 | 95 | 103 | 95 | 93 | 100 | 97 | 96 | 96 |
| Strain point (°C.) | 460 | 455 | 430 | 435 | 460 | 445 | 430 | 450 | 480 |
| Softening Point (°C.) | 665 | 670 | 660 | 670 | 685 | 662 | 660 | 675 | 695 |
| Coefficient of X-ray Absorption (0.6 Å, $cm^{-1}$) | 22.1 | 25.0 | 21.5 | 21.8 | 24.0 | 20.0 | 22.0 | 20.2 | 30.4 |

Figure 1:
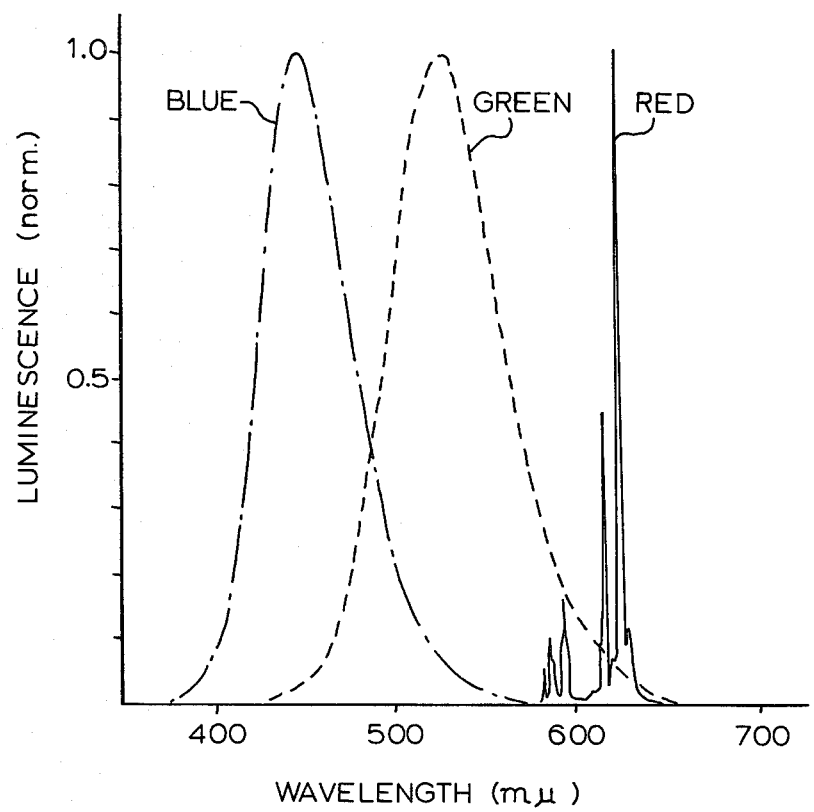
FIG. 1 shows luminescence spectra of the red-, green- and blue phosphor materials available for cathode ray tubes.
Figure 2:
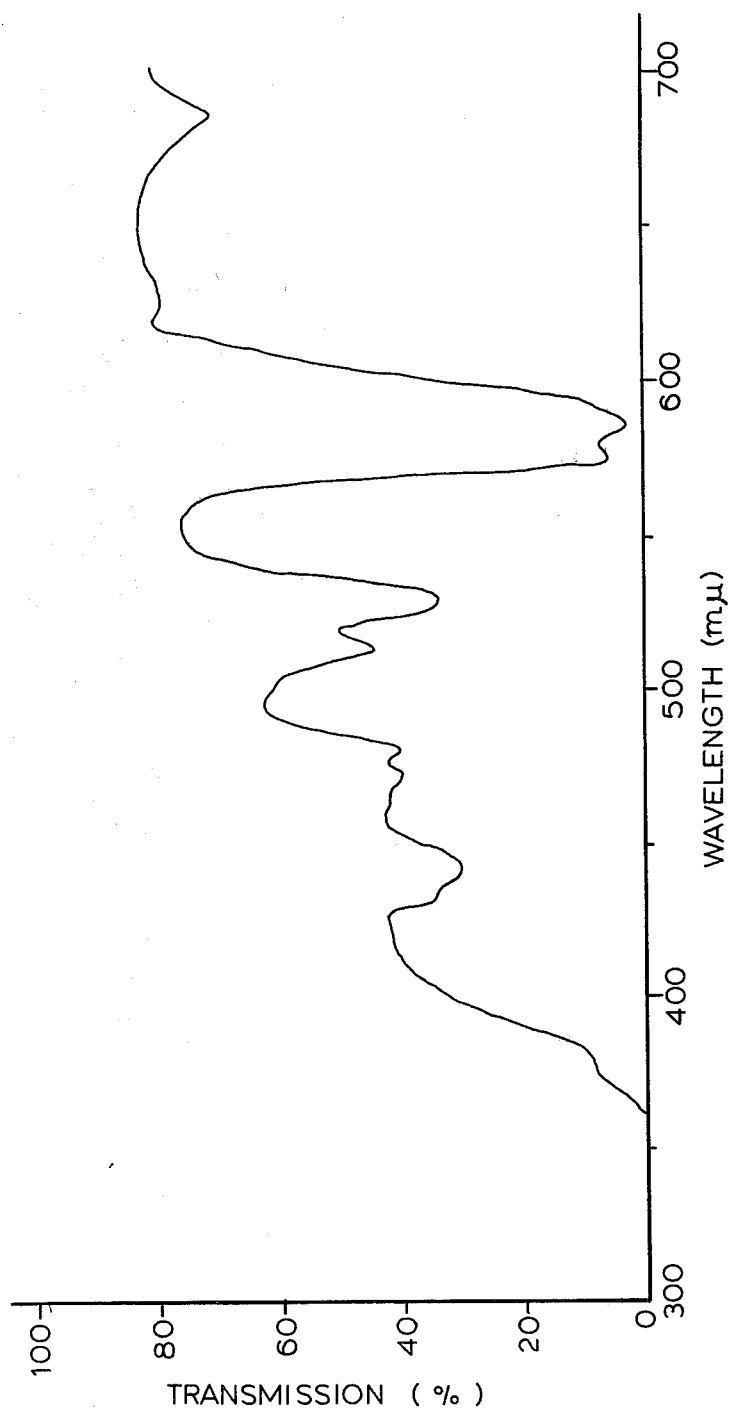
FIG. 2 shows a light transmission curve of the glass of Sample No. 1 according to the present invention.

From comparison of the luminescence spectra of the red-, green- and blue-phosphor materials in FIG. 1 and the light transmission curve shown in FIG. 2, it is seen that glass containing $Nd_2O_3$, $Pr_2O_3$, $Fe_2O_3$ and $CeO_2$ has a high transmittance in the wavelength region corresponding to the luminescence spectra of the red- and green-phosphor materials, whereas it effectively absorbs the other external light such as, for example, the blue light (480 mμ or less in wavelength) and the yellow light (570–600 mμ in wavelength), and thereby it can increase the contrast of the light-source cathode ray tubes for the red light or the green light. The absorption in the above-mentioned blue light wavelength region is the cooperative effect of $Pr_2O_3$, $Fe_2O_3$ and $CeO_2$, while the absorption in the yellow light wavelength region is due to inclusion of $Nd_2O_3$.

As described in detail above, the glass according to the present invention is most suitable as a glass bulb for red- or green-light-source cathode ray tubes.

In this connection, it is to be noted that as the remaining one kind of glass for use in a light-source cathode ray tube, that is, the glass for the blue light, it is preferable to use the cobalt ($Co_3O_4$) containing colored glass which has a high X-ray absorption capability and is less subjected to browning by X-ray and electron irradiation, and also which has an appropriate viscosity-temperature relation and an appropriate coefficient of thermal expansion.

Now description will be made on the reasons why the range of the glass composition was limited as referred to above.

While $SiO_2$ is a principal glass forming oxide contained in a large amount, if it exceeds 75%, the solubility and workability become poor. If it is less than 50%, then a coefficient of thermal expansion becomes too large and also chemical durability of the glass is deteriorated. More preferably it should be 55–70%.

$Al_2O_3$ is effective for improving chemical durability of glass, but if it exceeds 5%, the glass becomes hardly soluble and disappearance of blisters therein is retarded. More preferably it should be 1–4%.

CaO and MgO are also effective for improving chemical durability of glass, but if CaO exceeds 4% or MgO exceeds 2%, the glass becomes liable to be subjected to devitrification.

SrO, BaO, PbO, ZnO and $ZrO_2$ are contained by 1.5–25% in total and more preferably by 2–15% in total for the purpose of making the glass have a high X-ray absorption capability, but in the event that SrO exceeds 12%, BaO exceeds 16%, ZnO exceeds 3% or $ZrO_2$ exceeds 3%, then melting of the glass becomes poor, and if PbO exceeds 3%, the glass becomes liable to be discolored to brown due to electron irradiation.

$Li_2O$, $Na_2O$ and $K_2O$ are contained by 5-24% in total and more preferably by 10-20% in total for the purpose of improving melting property of the glass and also adjusting a coefficient of thermal expansion of the glass, but if $Li_2O$ exceeds 4%, the coefficient of thermal expansion becomes too large and a strain point is too much lowered, and if $Na_2O$ exceeds 15%, $K_2O$ exceeds 10% or the sum of $Li_2O+Na_2O+K_2O$ exceeds 24%, then chemical durability and electric insulation of the glass are deteriorated. On the other hand, if $Na_2O$ is less than 3%, $K_2O$ is less than 1% or the sum of $Li_2O+Na_2O+K_2O$ is less than 5%, then the melting becomes poor, the glass becomes liable to be subjected to devitrification and the strain point of the glass becomes too high, so that the glass is poor in workability.

$TiO_2$ and $CeO_2$ are added because they have the effect of preventing browning of glass due to X-ray or electron irradiation. The amount of addition if defined to be 2% or less for $TiO_2$ and 0.1-3% for $CeO_2$. Besides the above-mentioned effect, $CeO_2$ has the effect of converting ferrous ions in the glass into ferric ions under the coexistence with $Fe_2O_3$ and thereby lowering the transmittance of the glass principally in the wavelength region of blue light. For this purpose, $CeO_2$ is necessitated to be contained by 0.1% or more, but if it exceeds 3%, devitrification of metal cerium becomes liable to arise. Moreover, $CeO_2$ also has a high X-ray absorption capability, and hence, in this respect also it is effective for glass to be used in a cathode ray tube.

$Nd_2O_3$, $Pr_2O_3$ and $Fe_2O_3$ are coloring constituents for giving desired coloring capabilities to the glass. $Nd_2O_3$ gives a sharp absorbing power for yellow light to the glass, while $Pr_2O_3$ and $Fe_2O_3$ reduce a transmittance for blue light. If $Nd_2O_3$ exceeds 10%, $Pr_2O_3$ exceeds 5% or $Fe_2O_3$ exceeds 4%, then undesirably a transmittance of the glass is lowered all over the visible region, also melting is degraded and devitrification becomes liable to occur. On the other hand, if $Nd_2O_3$ is less than 1%, $Pr_2O_3$ is less than 0.5% or $Fe_2O_3$ is less than 0.1%, then the effects of the desired coloring capabilities cannot be achieved. More preferably, the above-referred coloring constituents should be contained by 4-8.5% for $Nd_2O_3$, 1.5-3.5% for $Pr_2O_3$ and 0.5-2.5% for $Fe_2O_3$. $Nd_2O_3$ and $Pr_2O_3$ are, in addition to the fact that they are constituents for giving desired coloring capabilities to the glass as described above, constituents having a high X-ray absorption capability. Accordingly, if the total amount of the previously described constituents having high X-ray absorption capabilities, that is, SrO, BaO, PbO, ZnO, $ZrO_2$ and $CeO_2$ plus the last-mentioned constituents $Nd_2O_3$ and $Pr_2O_3$ is selected within the range of 6-29%, then the composition is preferable as a glass for use in a cathode ray tube having a high X-ray absorption capability. If the total amount is less than 6%, the X-ray absorption capability is not sufficient, while if it exceeds 29%, devitrification becomes liable to occur.

In addition to the above-described various constituents, as refining agents $SbO_2$ and $As_2O_3$ could be added by 0.5% or less, respectively, and $F_2$, $P_2O_5$ and $B_2O_3$ could be added by 1% or less, respectively. Moreover, it is to be noted that in $Nd_2O_3$ and $Pr_2O_3$ are normally contained 0-2% $La_2O_3$ and 0-2% $Sm_2O_3$ as impurities.

What is claimed is:

1. Glass for use in a light-source cathode ray tube monochromatically emitting red or green light having the composition essentially consisting, in weight %, of 50-75% $SiO_2$, 0-5% $Al_2O_3$, 0-4% CaO, 0-2% MgO, 0-12% SrO, 0-16% BaO, 0-3% PbO, 0-3% ZnO, 0-3% $ZrO_2$, the sum of $SrO+BaO+PbO+ZnO+ZrO_2$ being 1.5-25%, 0-4% $Li_2O$, 3-15% $Na_2O$, 1-10% $K_2O$, the sum of $Li_2O+Na_2O+K_2O$ being 5-24%, 0-2% $TiO_2$, 0.1-3% $CeO_2$, 1-10% $Nd_2O_3$, 0.5-5% $Pr_2O_3$ and 0.1-4% $Fe_2O_3$.

2. Glass for use in a light-source cathode ray tube monochromatically emitting red or green light as claimed in claim 1, having the composition essentially consisting, in weight %, of 55-70% $SiO_2$, 1-4% $Al_2O_3$, 0-4% CaO, 0-2% MgO, 0-12% SrO, 0-16% BaO, 0-3% PbO, 0-3% ZnO, 0-3% $ZrO_2$, the sum of $SrO+BaO+PbO+ZnO+ZrO_2$ being 2-15%, 0-4% $Li_2O$, 3-15% $Na_2O$, 1-10% $K_2O$, the sum of $Li_2O+Na_2O+K_2O$ being 10-20%, 0.5-2.5% $CeO_2$, 4-8.5% $Nd_2O_3$, 1.5-3.5% $Pr_2O_3$ and 0.5-2.5% $Fe_2O_3$.

3. Glass for use in a light-source cathode ray tube monochromatically emitting red or green light as claimed in claims 1 and 2, in which the weight % of the sum of $SrO+BaO+PbO+ZnO+ZrO_2+CeO_2+Nd_2O_3+Pr_2O_3$ is 6-29%.

* * * * *